(12) United States Patent
Sobota et al.

(10) Patent No.: US 6,238,289 B1
(45) Date of Patent: May 29, 2001

(54) RADIO FREQUENCY GAME CONTROLLER

(75) Inventors: John Sobota; Louis Garner; Jason Gosior, all of Edmonton (CA)

(73) Assignee: Eleven Engineering Inc., Edmonton (CA)

( * ) Notice: Subject to any disclaimer, the term of this patent is extended or adjusted under 35 U.S.C. 154(b) by 0 days.

(21) Appl. No.: 09/480,035

(22) Filed: Jan. 10, 2000

(51) Int. Cl.$^7$ ............................................. A63F 9/24
(52) U.S. Cl. ..................... 463/39; 463/36; 273/148 B
(58) Field of Search .................... 463/39, 38, 37, 463/36; 273/148 B; 455/464, 463, 573, 67.4, 411

(56) References Cited

U.S. PATENT DOCUMENTS

| | | | |
|---|---|---|---|
| 4,334,221 | * 6/1982 | Rosenhagen et al. | 463/39 |
| 4,531,470 | * 7/1985 | Green et al. | 463/39 |
| 4,578,674 | * 3/1986 | Naker et al. | 463/39 |
| 4,754,268 | * 6/1988 | Moi | 403/36 |
| 4,924,216 | * 5/1990 | Leun | 463/39 |
| 5,044,010 | * 8/1991 | Frenkiel et al. | 455/464 |
| 5,098,110 | * 3/1992 | Yang | 463/39 |
| 5,533,010 | * 7/1996 | Tanaka | 455/464 |
| 5,605,505 | * 2/1997 | Han | 463/39 |
| 5,759,100 | * 6/1998 | Nakanishie et al. | 463/37 |
| 5,806,849 | * 9/1998 | Rutkowski | 463/39 |
| 5,854,621 | * 12/1998 | Junod et al. | 463/39 |

* cited by examiner

Primary Examiner—Michael O'Neill
(74) Attorney, Agent, or Firm—Alan J. Atkinson

(57) ABSTRACT

A game controller for communication between a user and an electronic game device transmitting signals to a receiver. The game controller identifies weakness in signal strength or operation and permits adjustment to a more effective operating frequency. The game controller comprises a portable housing, game controller keys attached to the housing for permitting the user to generate signals, a radio frequency sender engaged with the game controller keys for transmitting the signals to the receiver; and a controller attached to sender for determining a selected parameter regarding the signals and for communicating the parameter to the user. The radio frequency sender is capable of transmitting signals over multiple frequencies and preferable operates with the Remote Band frequency range. At least one of the keys can be operable by the user to change the signal frequency or the controller can automatically change the signal frequency to a more effective frequency. The controller can be capable of identifying parameters regarding the signal such as the signal strength and is capable of polling information over one or more discrete time periods. Information regarding the signal can be communicated with a display such as a light.

20 Claims, 1 Drawing Sheet

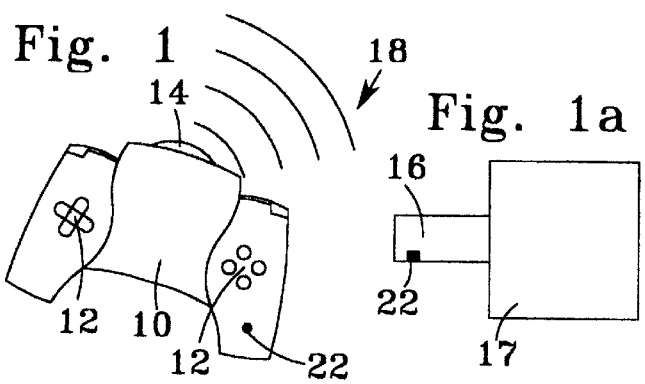
Fig. 1
Fig. 1a
Fig. 2
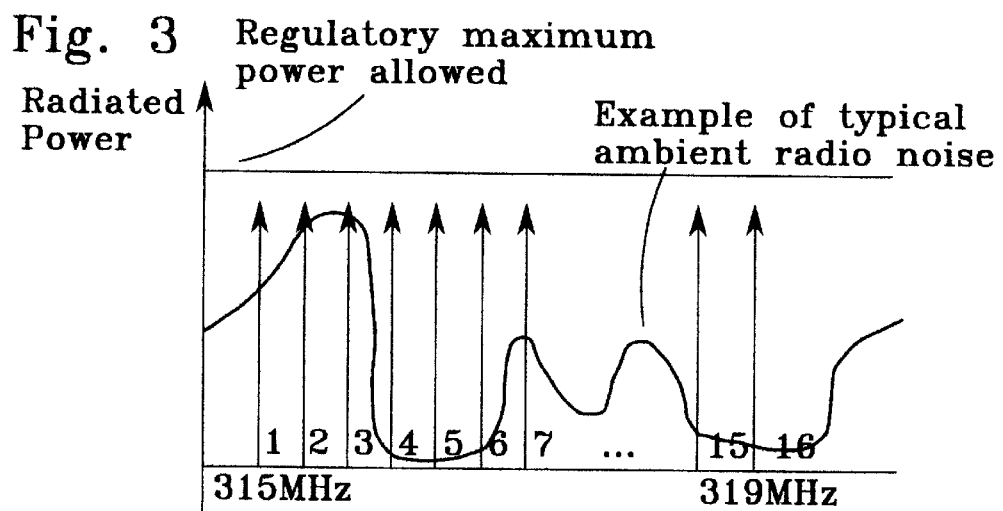
Fig. 3
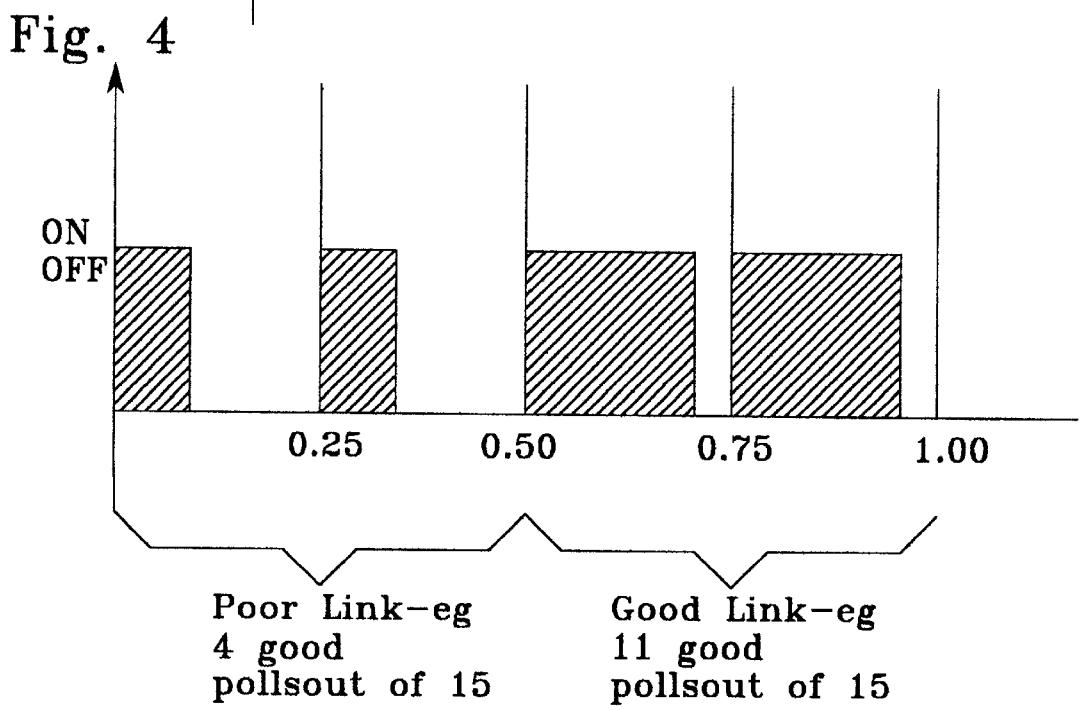
Fig. 4

RADIO FREQUENCY GAME CONTROLLER

BACKGROUND OF THE INVENTION

The invention described herein relates to the field of remote game controllers for operating electronic games. More particularly, the invention relates to an improved radio frequency operated remote game controller for operating an electronic game device.

Electronic games use software and hardware devices to simulate game situations and experiences through visual and audio stimulus. Game controllers provide interactivity to change the game direction or response. Many games are fast moving and require fast reflexive responses to the game situation and format, thereby requiring transmission of large data sets. Any interruption of such game is disruptive to the person's enjoyment and is highly undesirable.

Conventional game controllers are typically hard wired to the hardware or alternatively transmit data signals with infrared frequency transmission. Hard-wired controllers are capable of reliable, fast signal communication, however such controllers require wires leading from the controller to the hardware. Such wires present a safety hazard because persons and pets can trip over the wires, and further limit the operating mobility of the user relative to a central controller.

Certain multiple game devices have been proposed to permit simultaneous, multiple user operation of a game system, however such systems typically hardwire the controllers to the central control system and to other controllers. For example, U.S. Pat. No. 5,538,255 to Barker (1992) disclosed a system for a remote controlled multiplayer video game. U.S. Pat. No. 5,292,125 to Hochstein et al. (1991) disclosed a video game communicator electrically connected with telephone lines, and U.S. Pat. No. 4,372,558 to Shimamoto et al. (1979) also disclosed a remote game apparatus using a telephone line as the communication means.

U.S Pat. No. 4,531,740 to Green et al. (1985) disclosed a remote controller system for a video computer game which used radio frequency ("RF") transmission as a communication mechanism and required a reset mechanism on a control center. Data was transmitted through different channels, significantly limiting the flexibility of a controller and limiting the number of users able to simultaneously operate the game system.

Another radio broadcast system was disclosed in U.S. Pat. No. 5,806,849 to Rutkowski (1998) wherein long range signal transmission was proposed. Such system also depended on multiple channel transmission and used a single receiver to poll individual channels. Such polling requirement significantly increased delay in signal processing and limited high data transmission required in remote game transmission.

Governing jurisdictions stringently regulate spectrum utilization for radio frequencies. As representative examples, the United States regulates "Toy Bands" (45 MHz–75 MHZ) which provides relatively high power within the tightly restricted channel bandwidth, a "Remote Band" (285 MHz–322 MHz) having severe power restrictions within a relatively wide channel bandwidth, and an "Industrial Scientific and Medical Band" (902 MHz–928 MHz) which permits relatively high power levels. Because the power levels within a selected band are highly regulated, ambient environmental noise can overwhelm a transmitted signal and generate an inadequate signal to noise ratio. Additionally, the economics of constructing affordable game controllers significantly limits available design options.

Conventional game controller systems often provide multi-user capabilities and power efficiency based on frequency domain multiplexing ("FDM"). FDM uses multiple frequencies or channels to carry multiple signals through a common airspace, or one signal per channel. Systems incorporating FDM are undesirable because of additional cost and complexity, and because a larger transmission spectrum is required for the communication footprint. This requirement increases the possibility of signal interference from other signals, and with the possibility of controller interference with other products and appliances.

A need exists for an improved game controller system which does not have the limitations of prior art controllers and which adjusts to overcome ambient noise. The system should efficiently and accurately transmit large quantities of data and should be adaptable to different operating environments.

SUMMARY OF THE INVENTION

The invention provides a game controller for communication between a user and an electronic game device transmitting signals to a receiver. The game controller comprises a portable housing, game controller keys attached to the housing for permitting the user to generate signals, a radio frequency sender engaged with the game controller keys for transmitting the signals to the receiver; and a controller attached to sender for determining a selected parameter regarding the signals and for communicating the parameter to the user.

In other embodiments of the invention, the radio frequency sender is capable of transmitting signals over multiple frequencies, at least one of the keys can be operable by the user to change the signal frequency, or the controller is capable of changing the signal frequency. The controller can be capable of identifying parameters regarding the signal such as the signal strength, and is capable of polling information over one or more discrete time periods. Information regarding the signal can be communicated with a display such as a light operable by duration or frequency.

BRIEF DESCRIPTION OF THE DRAWINGS

FIG. 1 illustrates a controller having a transmitter for sending signals to a RF receiver.

FIG. 2 illustrates a graph of different criteria related to game controller operation.

FIG. 3 illustrates radiated power plotted against a preferred frequency range and a representative plot of ambient noise.

FIG. 4 illustrates representative polls in discrete time periods of 0.25 seconds wherein up to fifteen polls per time period are assessed.

DESCRIPTION OF THE PREFERRED EMBODIMENTS

The invention provides a system for remote communication between a user and an electronic game device. The invention uniquely provides uninterrupted RF data communication between multiple users and time domain multiplexed ("TDM") transmission within one or more channels to save battery power and to enhance data transmission with a reduced spectral footprint and diminished radiated energy. The invention provides unique capabilities to transmit data at fast rates and provides for addressed communications between one or more transmitters and one or more receivers.

As shown in FIG. 1, controller 10 has sensors or keys 12 which perform different operating functions. Keys 12 can be responsive to pressure, audible sounds, light, movement, and other stimulus. FIG. 1 illustrates an RF sender such as transmitter 14 which is attached to controller 10 and broadcasts signals to RF receiver 16 integrated with electronic game device 17. RF receiver 16 can be hard-wired into electronic game device 17 or can comprise a remotely connected or plug-in module attachable to electronic game device 17. Transmitter 14 can be mated with receiver 16 by indexed names, signals, or selected addresses by assigning unique address codes to each controller. As shown in FIG. 1a, multiple controllers 10 can be engaged with a single receiver 16 and game device 17.

Multiple controllers 10 with corresponding transmitters 14 can be integrated with multiple receivers 16 to create game system 18. Alternatively, one or more receivers 16 can operate with one or more controllers 10 in different combinations of the invention. The invention is particularly suited to electronic game applications because of the random timing and low frequency of controller events required for game applications. Controller events are defined as a change in state of the set defined by controller keys 12.

The invention provides for one or more controllers 10 operating in the Remote Band preferably identified as a frequency range between 315 and 319 MHz. In other embodiments of the invention, the frequency range can be expanded to between 285 and 325 MHz for successful operation of the invention. Multiple channels are possible, and sixteen channels provide an adequate number of combinations for most game applications. Transmission can be continuous in a preferred embodiment of the invention and preferably comprises one-way (simplex) data communication. Receiver channel scanning functions provide optimal connectivity as described below.

By selecting the identified Remote Band, the invention uniquely accommodates conflicting criteria created by regulatory, use, economic, and engineering considerations. Conventional regulations require extremely low transmission power devices which can lead to ambient noise domination of the signal and prevention of the RF from detecting sufficient signal-to-noise ratios. Economic considerations for RF devices are significantly impacted by the choice of frequency band, use of standard or custom intermediate frequencies, by the number of intermediate frequencies, by the required data rate and by the choice of modulation method.

FIG. 2 plots three lines symbolizing performance characteristics, regulatory constraints, and economic considerations. The space bounded by these considerations identifies the effective operating range, or "viability space". If any of the three considerations becomes more restrictive and moves toward the middle, the available size of the viability space will become smaller. As illustrated in FIG. 2, the viability space for a radio wireless controller is very small and requires innovation for the creation of an effective radio wireless controller.

A plurality of transmission channels provide selectivity in location of an optimal transmission link. If a channel is impacted with undesirable ambient noise, the invention provides channel selectivity to permit switching to a less affected channel. FIG. 3 illustrates this concept wherein radiated power is plotted against a preferred frequency range, and the regulatory maximum power is identified. Ambient noise within the preferred frequency range is illustrated as an irregular curve, and relationships between such ambient noise and the available channels is Operation of a game controller is usually limited to twenty-five feet, and the orientation of a controller should not be affected by tilting of the controller in forward, back or side-to side directions. The perceived latency of a controller is minimized if the controller successfully delivers new data for each poll at a selected rate such as 60 Hz. The controller should preferably avoid external antenna subject to damage, and requirements for multiple users can be accommodated with multiplexing in a time domain or frequency domain. Overall requirements for avoiding blockage will determine the signal strength, receiver sensitivity and selectivity, and band choice.

A listening function can be used to "listen-before-send" without requiring duplex or bi-directional communication. This feature of the invention simplifies data transmission by permitting transmission in one direction instead of in two directions. A transmitter 14 that wishes to transmit can first monitor the channel to determine whether traffic exists. After the channel is confirmed as clear, transmitter 14 can transmit as a simplex or one direction communication. Other techniques can be derived to provide for signal transmission in one direction between transmitter 14 and receiver 16, or vice versa. If confirmation of signal transmission was desired, bi-directional transmission could be included in an alternative embodiment of the invention.

In another embodiment of the invention, time domain multiplexing can be combined with frequency domain multiplexing so that multiple channels are used in combination with multiple users operating on each channel. This combination would permit two or more transmitters 14 to transmit data on each channel while permitting expansion of the signal transmission capabilities over multiple channels.

The invention can use "burst" transmission wherein transmitter 14 does not continuously transmit data packets, but transmits data in a plurality of relatively short, discrete time interval "bursts". Transmitter 14 is disabled whenever a packet is not being transmitted and is only enhanced during very brief periods ("bursts") during which a packet is transmitted. The RF carrier is therefore suppressed at all times except during such bursts. This feature of the invention reduces the actual operation time of transmitter 14, and reduces the energy required by controller 10. Accordingly, battery life is extended and active gaming play time interruption is reduced. Moreover, the amount of energy radiated by controller 10 is reduced, therefore reducing interference.

In one application of the invention, one or more controllers 10 can transmit multiple data sets on a single channel. In another application, one or more controllers 10 are capable of transmitting on different channels simultaneously. Additionally, controller 10 is capable of changing from one channel to another, thereby providing flexibility in game operation between multiple users. A user can press a "channel key" on controller 10, and controller 10 then broadcasts a command on all channels telling the mated receiver 16 to change to channel "A". Controller 10 then switches to channel "A". The mated receiver 16 has already received the command and also switches to channel "A". Because the broadcast signal was sent on all channels, the prior operating channel of receiver 16 does not inhibit the ability of controller 10 to connect with receiver 16. All other non-mated receivers 16 also receive the same broadcast signal, however the other receivers 16 ignore such broadcast signal because such receivers are mated with other controllers 10.

Display light 22 provides an indicator permitting a user to identify the channel in operation, and to identify the channel performance. If controller 10 has not automatically shifted the channel to the optimal channel, the user can identify this fact with light 22 and can manually change channels by operation of a shift button or other command device. Light 22 facilitates the user in selecting a relatively low noise channel, and in reconfiguring the system to enable an optimal radio link. A display such as light 22 can be attached to controller 10, can be located proximate to controller 10, or can be attached to receiver 16 in different embodiments of the invention.

Although different RF frequencies are possible, frequencies in the Remote Band are relatively quiet because regulatory restrictions limit the number of powerful transmitters operating in such frequency band. The ability to transmit at low power levels within the Remote Band conserves battery power within controller 10, extends useful battery life, and protects the use from potentially harmful RF signal levels. Multiple channels permit navigation through noisy environments until a clear channel is identified for use. Ultra low power transmission in conjunction with multiple channel implementation is also beneficial because the ultra low power causes less channel-to-channel interference. Channels can be closer together or better channel-to-channel noise characteristics will be realized.

By providing for one-way (simplex) transmission, fewer electronic components are necessary because both terminals perform limited functions. One terminal sends, while another terminal receives under one-way transmission. A typical controller polls 60 times per second, therefore new data must arrive at the receiver prior to each poll.

With multiple channels a protocol should exist for arriving at the same channel. A representative protocol can comprise:

1. The least significant four bits of the mating number is defined as the default channel. Controller 10 and RX power up to this channel.

2. Controller 10 is the master for channel determination. The user sets the channel on controller 10, and controller 10 transmits to the RX a message instructing a change to the new channel. This message can be sent multiple times.

3. The receiver looks for properly formatted data packets bearing the mating number of the mated controller. If a certain time interval passed without the RX seeing "good packets" then the RX begins to hunt through the channels, looking for a mate identifiable as "good packets".

A similar technique can be implemented wherein controller 10 scans through all channels and "broadcasts" the landed channel. After controller 10 power is turned on, light 22 will flash quickly three times to identify that the power has been initiated. Light 22 will turn on and display the quality of the radio link. If light 22 flashes and in on more than half of the time then a good radio link is established. If light 22 is off or is on less than half of the time, radio link quality should be improved. During a channel change, light 22 will turn off for half a second.

Controller 10 can include software, hardware, or firmware for operating light 22. Controller 10 can monitor for successful polls and missed polls. If controller 10 polls the RX sixty times in one second and controller 10 takes samples every ¼ second, in such interval the TX could have provided new data to the controller for fifteen polls in the best case, and zero polls in the worst case. Any number of polls between zero and fifteen would provide information regarding the relative suitability of the existing channel connection as illustrated in FIG. 4. Light 22 is modulated using a pulse width modulation at a frequency of 4 Hz.

The number of "good polls" is proportional to the amount of time that light 22 is turned on in the selected time interval of ¼ second. As shown in FIG. 4 for the first two intervals, light 22 reports a good link of 11 polls out of fifteen, and light 22 provides a quasi-analog representation of link quality. This allows the user to reconfigure the system so that light 22 is on as much as possible.

Alternative drive implementations for light 22 are also possible, as the brightness of light 22 can be altered instead of an "on time" signal. Instead of returning information regarding the "good packets" received at the TX as a percentage of the theoretical maximum feedback, light 22 could be limited to two or three flashing schemes each representing a threshold performance level. During a channel change, the interruption of light 22 affirms to the user that communication is temporarily lost and is reinitiated to affirm the reconnection of communication with another channel. The combination of Remote Band frequencies using ultra low power and multiple channels to navigate the expected noise and light 22 to indicate the functioning of a good channel uniquely provides superior operating results.

In other embodiments of the invention, a user could enter a key sequence in controller 10, and controller 10 can enter a scan mode. Controller 10 can inform RX of the scan mode, and can transmit on each channel for one second. The RX can track the performance of each channel, and can the RX can turn on light 22 when the channel rotates to the optimal channel. The user can visually observe light 22 and can press a button to terminate the scan mode, and the controller can inform the RX of the termination.

Other embodiments of the invention can be implemented with dual communication between controller 10 and the RX. Automatic channel changes could be made without requiring intervention by the user.

The Remote Band frequency range provides another advantage of eliminating the need for an external antenna with controller 10 or with receiver 16. The absence of required antennas is significant for providing easy and damage free operation of game systems. Operation of the invention at high frequency enables high data rates (56,000 bps and higher) which in turn enables very short burst transmissions. These short burst transmissions enable time domain multiplexing, enhance power efficiencies, and reduce the radiated RF energy. This combination also reduces the possibility of potential interference.

The invention operates at high data transmission rates which reduces delay in signal transmission and enhances game play response. Rates of 56,000 bps permit the transmission of 56 bits in 1 mS. A 1 mS transmission, for example, can accommodate a 56 bit packet comprised of a 16 bit event plut 40 bits of address, framing and error detection/correction information. For infrared transmission typically used in conventional game systems, the same event having one-half the bits may require 3 mS, thereby establishing RF transmission in the invention as a significantly faster (by three hundred percent) mechanism for transmitting data in game operations. Burst transmission of such 1 mS packets each containing, for example, 56 bits, allows for sufficient overheads such as addresses, packet framing and error detection/correction. Because the incidence of packets created by any one transmitter would be 60 or fewer per second including duplicates, TDM is possible because one transmitter 14 uses only 60/1000 or six percent of the channel, and ninety-four percent of the channel is available for other traffic.

Data packets are encapsulated so that layers of bit framing, error detection, address, and key 12 state information are encapsulated within the same packet. Error control and recovery can be accomplished with universal asynchronous receiver/transmitter (UART) oriented protocol. Alternatively, forward error correction can be implemented to eliminate the need for other error correction techniques. Guard patterns can be integrated for error detection, with guard bits in selected patterns surrounding data packets. If receiver 16 observed a defect in such guard patterns, receiver 16 would be alerted that the integrity of the packet had been breached.

An LED lamp such as light 22 can provide visual information regarding data received or transmitted by RF transmitter 14. Although the use of addresses permits time domain transmission between the correct transmitter 14 and receiver 16, controller 10 can be temporarily reprogrammed with the address code of a foreign receiver, enabling it to function with the foreign receiver for a period of time if required.

IR transmissions are typically realized utilizing data rates much lower than 56,000 bps. The IR technology consequently has a diminished ability to create very short burst transmissions which in turn limits the TDM possibilities. Conventional IR controller solutions are limited to two controllers, whereas the invention can be incorporate one or more splitters or multitaps attached to receiver 16 to add additional controllers 10 to communicate with the same receiver 16. The higher data throughput provided by using RF provides suitable operation for advanced or next generation game controllers such as those utilizing analog joystick control.

In another embodiment of the invention, each controller can transmit data over separate channels within the RF spectrum. The flexibility to operate controllers over different channels, and to multiplex data transmission from different controllers over the same frequency, permits flexibility in the system capability to operate multiple controllers in the same room with one or more radio frequency receivers and electronic game devices. If TDM permits three controllers 10 on the same channel, a twelve controller system uses four frequencies or channels instead of twelve.

In addition to the speed capabilities of RF transmission techniques taught by the invention, a low duty cycle (six percent in the earlier example) of transmitter 14 permits transmitter 14 to be turned off most of the time (ninety-four percent in this example). The energy saving feature of the invention is particularly important for portable game controllers subjected to long, continuous play periods. By conserving battery power, the system design of the invention provide for longer operating times for the same battery power, which minimizes game disruption.

Whereas time domain multiplexing is conventionally used in continuous data transmission utilizations, the invention uniquely uses time domain multiplexing to transmit real time data for the purpose of game control transmission. Event driven transmission provides enhanced responsiveness over polling and other techniques because data transmission occurs immediately after the occurrence of an event. The absence of a designated transmission time is energy efficient and provides greater flexibility in the transmission of more data packets. This feature reduces transmission delays and provides enhanced controller 10 responsiveness to the user. As used herein, the term "user" can comprise a person, another controller, or other mechanism.

Modulation of the RF signal can be accomplished with ASK, FSK, Quadrature modulation, spread spectrum, or other techniques. Events can be compressed to lower the event count and to assist time domain modulation. By lowering the number of events, collisions will be reduced and more users can function on each channel.

In another embodiment of the invention, listen-before-send capabilities can be added to controller 10. For example, a carrier detect on controller 10 could provide the capability of determining whether another controller is transmitting or not at a certain time. Having controller 10 listen for traffic prior to sending would reduce collisions dramatically. This would reduce the system dependence on redundant packet transmissions and would create increased TDM efficiencies by permitting more users per channel.

Gaming systems are preferably economic to manufacture, which requires the fewest number of components. Battery operation and long hours of continuous use dictate power efficiencies in remote components. Although different combinations are possible as described, single-channel is preferable to multi-channel communication even though TDM can be implemented to enhance both multi and single-channel systems. Burst transmission is preferable to continuous transmission, because TDM effectively uses brief signal transmissions. The simplicity of single-direction (simplex) is preferable to two-direction (duplex) even though duplex systems can be designed to work with TDM gaming systems disclosed herein. Asynchronous communication is preferable to synchronous communication because data links between multiple controllers would not be required to synchronize the timing of multiple transmissions.

Although the invention has been described in terms of certain preferred embodiments, it will be apparent to those of ordinary skill in the art that modifications and improvements can be made to the inventive concepts herein without departing from the scope of the invention. The embodiments shown herein are merely illustrative of the inventive concepts and should not be interpreted as limiting the scope of the invention.

What is claimed is:

1. A game controller for communication between a user and an electronic game device transmitting signals to a receiver, comprising:

a portable housing;

game controller keys attached to said housing for permitting the user to generate signals;

a radio frequency sender engaged with said game controller keys for transmitting the signals to the receiver; and a controller attached to said sender for determining a selected parameter regarding the signals and for communicating said parameter to the user.

2. A game controller as recited in claim 1, wherein said radio frequency sender is capable of transmitting signals over multiple frequencies.

3. A game controller as recited in claim 2, wherein at least one of said keys is operable by the user to change the signal frequency transmitted by said radio frequency sender.

4. A game controller as recited in claim 2, wherein said controller is capable of changing the signal frequency transmitted by said radio frequency sender.

5. A game controller as recited in claim 4, wherein said controller is capable of identifying the strength of a signal transmitted by said radio frequency sender and is capable of changing the signal frequency to a stronger frequency.

6. A game controller as recited in claim 2, wherein said controller is capable of polling information regarding the selected parameter over a discrete time period, and is further capable of determining whether said polled information exceeds a selected threshold.

7. A game controller as recited in claim 6, wherein said controller is capable of changing the signal frequency if said polled information is less than a selected threshold.

8. A game controller as recited in claim 7, wherein said controller is capable of changing the signal frequency if said polled information is less than a selected threshold over two consecutive discrete time periods.

9. A game controller as recited in claim 7, wherein said controller is capable of polling information at the changed frequency to determine whether said polled information exceeds a selected threshold.

10. A game controller as recited in claim 6, further comprising a display engaged with said controller for communicating to the user a message regarding said polled information.

11. A game controller as recited in claim 10, wherein said display comprises a light.

12. A game controller as recited in claim 11, wherein said controller is capable of controlling the duration of said light operation.

13. A game controller as recited in claim 11, wherein said controller is capable of controlling the frequency of said light operation.

14. A game controller as recited in claim 2, wherein said radio frequency sender is capable of transmitting signals at frequencies between 315 to 319 MHz.

15. A game controller for communication between a user and an electronic game device transmitting signals to a receiver, comprising:

a portable housing;

game controller keys attached to said housing for permitting the user to generate signals;

a radio frequency sender engaged with said game controller keys for transmitting the signals to the receiver over a plurality of frequencies; and a controller attached to said sender for determining the strength of the transmitted signals and for communicating to the user information regarding said signal strength.

16. A game controller as recited in claim 15, wherein said controller is capable of identifying whether said signal strength is less than a selected amount, and is further capable of changing said radio frequency sender to another frequency having a signal strength exceeding the selected amount.

17. A game controller as recited in claim 15, wherein said controller is capable of polling information regarding the signal strength over a discrete time period, and is further capable of displaying said information.

18. A game controller as recited in claim 15, further comprising a display engaged with said controller for communicating to the user a message regarding said information.

19. A game controller as recited in claim 18, wherein said display comprises a light and said controller is capable of controlling the duration of said light operation.

20. A game controller as recited in claim 18, wherein said display comprises a light and said controller is capable of controlling the frequency of said light operation.

* * * * *

(12) INTER PARTES REEXAMINATION CERTIFICATE (1194th)
United States Patent
Sobota et al.

(10) Number: US 6,238,289 C1
(45) Certificate Issued: Oct. 26, 2015

(54) RADIO FREQUENCY GAME CONTROLLER

(75) Inventors: John Sobota, Edmonton (CA); Louis Garner, Edmonton (CA); Jason Gosior, Edmonton (CA)

(73) Assignees: ELEVEN ENGINEERING, INC., Edmonton, Alberta (CA); ELEVEN ENGINEERING GAME CONTROL LLC, New York, NY (US)

Reexamination Request:
No. 95/001,486, Nov. 15, 2010
No. 95/001,617, May 9, 2011

Reexamination Certificate for:
Patent No.: 6,238,289
Issued: May 29, 2001
Appl. No.: 09/480,035
Filed: Jan. 10, 2000

(51) Int. Cl.
*A63F 13/06* (2006.01)
*A63F 13/02* (2006.01)
*A63F 13/20* (2014.01)

(52) U.S. Cl.
CPC ......... *A63F 13/06* (2013.01); *A63F 2300/1025* (2013.01)

(58) Field of Classification Search
None
See application file for complete search history.

(56) References Cited

To view the complete listing of prior art documents cited during the proceedings for Reexamination Control Numbers 95/001,486 and 95/001,617, please refer to the USPTO's public Patent Application Information Retrieval (PAIR) system under the Display References tab.

*Primary Examiner* — John Hotaling

(57) ABSTRACT

A game controller for communication between a user and an electronic game device transmitting signals to a receiver. The game controller identifies weakness in signal strength or operation and permits adjustment to a more effective operating frequency. The game controller comprises a portable housing, game controller keys attached to the housing for permitting the user to generate signals, a radio frequency sender engaged with the game controller keys for transmitting the signals to the receiver; and a controller attached to sender for determining a selected parameter regarding the signals and for communicating the parameter to the user. The radio frequency sender is capable of transmitting signals over multiple frequencies and preferable operates with the Remote Band frequency range. At least one of the keys can be operable by the user to change the signal frequency or the controller can automatically change the signal frequency to a more effective frequency. The controller can be capable of identifying parameters regarding the signal such as the signal strength and is capable of polling information over one or more discrete time periods. Information regarding the signal can be communicated with a display such as a light.

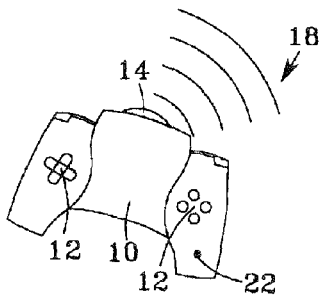

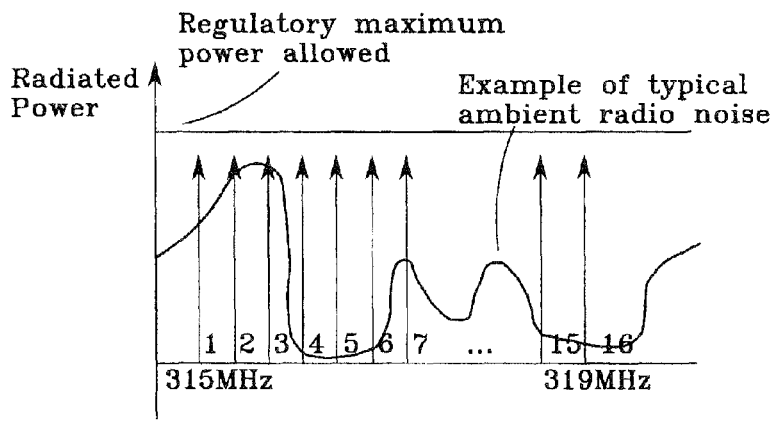

INTER PARTES REEXAMINATION CERTIFICATE

THE PATENT IS HEREBY AMENDED AS INDICATED BELOW.

AS A RESULT OF REEXAMINATION, IT HAS BEEN DETERMINED THAT:

Claims 1-20 are cancelled.

* * * * *